350-374 SR

XR 3,784,794

United States Patent [19]

Allais

[11] 3,784,794

[45] Jan. 8, 1974

[54] ELECTRO-OPTICAL READER FOR BAR CODES OR THE LIKE

[75] Inventor: David C. Allais, Edmonds, Wash.

[73] Assignee: National Bank of Commerce of Seattle, Seattle, Wash.

[22] Filed: Oct. 10, 1972

[21] Appl. No.: 296,310

[52] U.S. Cl. ...................... 235/61.11 E, 250/219 D

[51] Int. Cl. .......................... G06k 7/10, G08c 9/06

[58] Field of Search ............................ 235/61.11 E; 250/219 R, 219 D, 219 DC, 219 Q; 340/146.3 SY

[56] References Cited

UNITED STATES PATENTS

| | | | |
|---|---|---|---|
| 3,655,945 | 4/1972 | Bowen et al. | 235/61.11 E |
| 3,673,416 | 6/1972 | Berler | 235/61.11 E |
| 3,684,868 | 8/1972 | Christie et al. | 235/61.11 E |
| 3,700,858 | 10/1972 | Murthy | 235/61.11 E |
| 3,727,030 | 4/1973 | McMurtry | 236/61.11 E |
| 3,731,064 | 5/1973 | Berler et al. | 235/61.11 E |

*Primary Examiner*—Daryl W. Cook
*Attorney*—Christensen & Sanborn

[57] ABSTRACT

An improved hand-held electro-optical reader includes a housing supporting at one end a transparent, substantially spherical member for conducting light to and from the surface of a record on which coded data in the form of a bar code or the like appears. A first element, which may comprise either a light source or a light detector, is disposed within the housing at some distance from the upper surface of the spherical member. A second element, which also may comprise either a light source or detector, is located adjacent the spherical member's upper surface. Various embodiments of this basic reader are described and illustrated, including a finger grip design.

18 Claims, 8 Drawing Figures

ELECTRO-OPTICAL READER FOR BAR CODES OR THE LIKE

FIELD OF THE INVENTION

This invention generally relates to electro-optical sensing or reading devices, and, more particularly, to a hand-held electro-optical reader for reading coded data in the format of a bar code or the like from a record member.

BACKGROUND OF THE INVENTION

Semiautomated sensing systems for entry of data from record members into a digital processor are well known to the prior art. A preferred type of semiautomated sensing system for merchandising applications includes a hand-held probe which is physically scanned by an operator across the record member. Generally, the record member has data located thereon in the form of a printed code. One type of code that has been implemented in merchandising applications, wherein the record member is affixed to an article, is that known as a bar code which comprises a series of parallel lines or bars. In a bar code, the spacing between the bars or the relative bar width carries the data.

When the hand-held probe is scanned across a record member having a bar code, for example, the changing light levels due to differing reflectances of the bars and the record member on which they are imprinted, are optically detected and converted into corresponding electrical signals. To provide this operation, the probe generally includes a light source and a light detector situated within a pen-like housing.

The use of a hand-held sensor or pen poses certain problems. During the scanning operation, the operator is free to hold the pen at various angles with respect to the surface of the record member. Therefore, the sensor must have the capability of distinguishing between areas of different reflectances, and of accurately reflecting the transitions from an area of one reflectance to an area of another reflectance, for the various angles at which the pen may be held.

To provide this capability, the prior art devices usually have included means for concentrating the beam from the light source or means for concentrating the reflected light from the record member to the light detector. The most typical concentrating means has been a fiberoptic bundle. A sensor using a fiberoptical bundle has certain disadvantages in merchandising applications. First, because of the large number of sensors which will be required by the retail industry, cost is important. Second, it is likely that the pen will be subjected to physical abuse by the operator, as by dropping or otherwise, The fiberoptic bundles known to the prior art are both expensive and very fragile.

It is therefore an object of this invention to provide a highly sensitive electro-optical reader for data in the form of a bar code or the like located on a record member.

It is another object of this invention to provide such a reader which is simple, rugged in construction, and inexpensive, to permit its use as a hand-held reading device in a semiautomated data sensing system.

It is a further object of this invention to provide such a reader which does not require the use of expensive and fragile fiberoptic bundles for its successful implementation, and which yet has improved sensitivity for discriminating narrow bars and spaces over devices incorporating such bundles.

SUMMARY OF THE INVENTION

These objects and others are achieved, briefly, by situating at least one light source element and at least one light detecting element within a housing, and by providing means comprising a substantially spherical transparent member situated in one end of said housing for coupling light from and to said light source element and said light detecting element.

BRIEF DESCRIPTION OF THE DRAWINGS

The invention can perhaps best be understood by reference to the following portion of the specification, taken in conjunction with the accompanying drawings in which.

DESCRIPTION OF A PREFERRED EMBODIMENT

Figure 1:
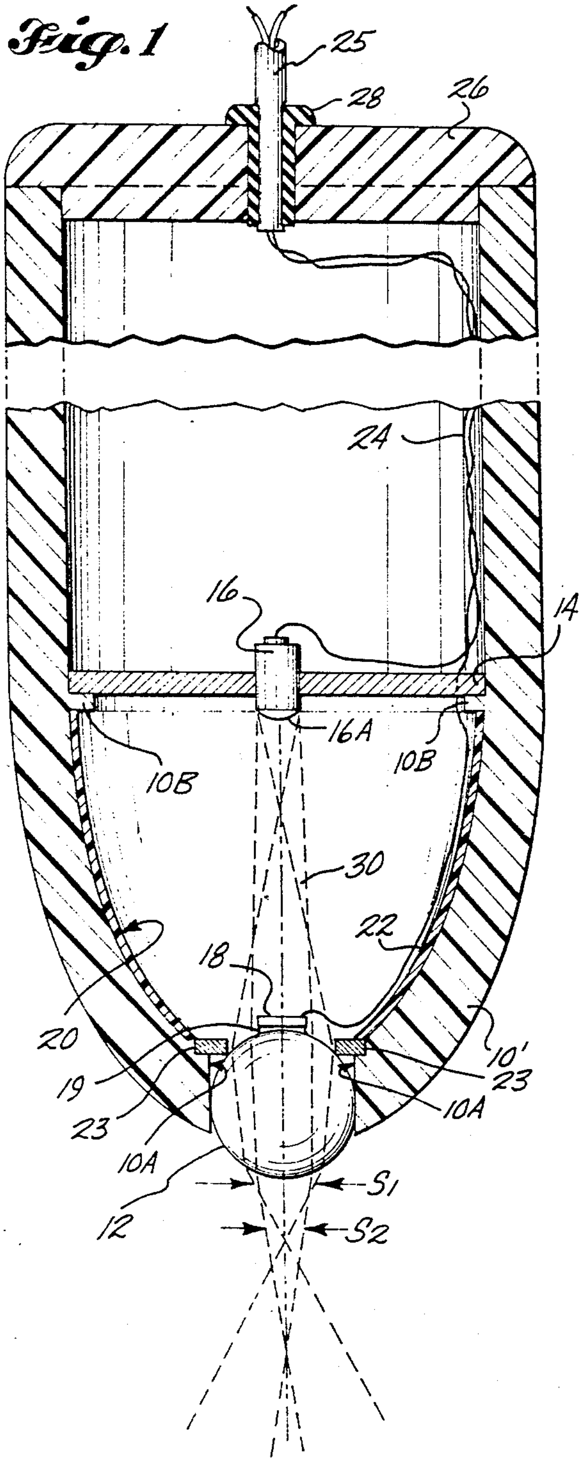
FIG. 1 is a side section view of a first embodiment of the invention.

With reference now to FIG. 1, a generally cylindrical housing 10 has a first, tapered end 10' which defines a cylindrical passage 10A. Situated within passage 10A is a substantially sperical member 12 which is composed of a transparent material. Preferably, member 12 is a commercially available synthetic sapphire ball, primarily because of the relative hardness of sapphire, although member 12 could as well be composed of glass, quartz, or other transparent material having a substantially hard surface. Synthetic sapphire balls are readily available in large quantities at a very reasonable cost with a high optical quality, and therefore are preferred.

The housing 10 includes an interior shoulder 10B situated at some distance from the spherical member 12 of which in turn supports a disc 14 having centrally mounted therein an element 16 which may comprise either a light source 8 or a light detector, as hereinafter explained. A second element 18, which also may comprise either a light source or a light detector, is disposed within the interior of housing 10 defined by tapered end 10' and situated adjacent an upper surface of the spherical member 12. In the embodiment of FIG. 1, the second element 18 is affixed to the top surface of member 12 by a transparent adhesive 19. However, the second element 18 could as well be disposed in a transparent supporting disc similar to disc 14 and situated a short distance away from the top surface of spherical member 12. The outer portions of spherical member 12 are masked by an optically opaque member 23 for purposes detailed hereinafter. To complete the structure, the walls of the cavity defined by disc 14 and portion 10' may be provided with a suitable light-absorbing covering 20 to minimize unwanted light reflections within the cavity. Finally, electrical leads 22 associated with the second element 18 and leads 24 associated with the first element 16 are formed into a cable 25 which is supported by a bushing 28 disposed in a closure 26 of the second end of the housing 10 and thus made available for connection to the remaining electrical circuitry of the sensor, not illustrated, which is conventional in the art.

The advantages of the present invention arise primarily from the fact that the light concentrating element therein comprises the substantially spherical member 12 which is rugged, cheap, and readily available. To illustrate these advantages, reference to a specific example will be made. The elements 16 and 18 were aligned on a common axis with a diameter of the spherical member 12. Spherical member 12 comprised a synthetic sapphire ball having a diameter of 0.125 inches. Element 18 comprised a phototransistor. Element 16 comprised a light-emitting diode (LED) which was disposed approximately 1.5 inches from element 18. The LED was provided with an integral focusing lens.

With this arrangement, a resultant light beam 30 from the light source including element 16 and lens 16A strikes a portion of the upper surface of member 12 bounded by the mask 23 and element 18 and is refracted by the member 12 into a spot S1 adjacent the bottom surface of member 12 having a diameter of approximately 0.012 inches, and into a spot S2 having a diameter of approximately 0.003 inches at 0.01 inches from the lower surface of member 12. Therefore, a very concentrated light beam is provided.

If a record member is now placed adjacent the spherical member 12, the transmitted and refracted light beam is reflected back to the member 12 with an intensity dependent on the reflectance of the record member. Some of the reflected light strikes the member 12 with a nearly normal incidence and thereby is transmitted with little refraction directly through the center of the spherical member 12 to the light detector 18 situated on the upper surface thereof.

It is estimated that this arrangement permits the surface of the record member to be tilted at an angle of 50° with respect to the common axis of member 12, and elements 16, 18 with little degradation in reading performance. The function of mask 23 is to block those rays of beam 30 which would strike the outer portions of spherical member 12. Blocking these outer rays results in a more concentrated light beam.

Figure 2:
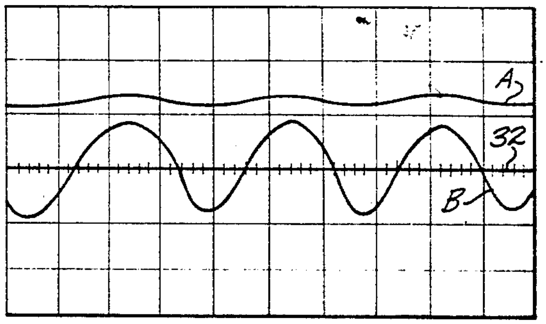
Fig. 2 PRIOR ART
FIG. 2 is a graph showing the response of a typical prior art optical reader incorporating a fiberoptic bundle to a typical record.
Figure 3:
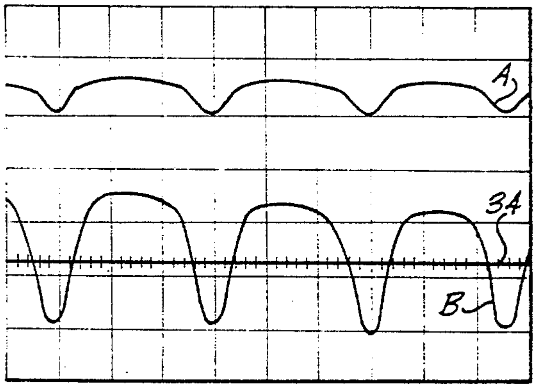
FIG. 3 is a graph illustrating the response of the optical reader shown in FIG. 1 to the same record member.

To illustrate the difference in sensitivity between a device constructed as in the previous example according to the teachings of the invention, and a typical fiberoptic device of the prior art, reference should be made to FIGS. 2 and 3. FIG. 2 represents a chart illustrating at A, the unamplified output from a light pen having a center fiberoptic member of 0.005 inches diameter coupling reflected light to a photocell detector, and a plurality of optical fibers surrounding the center bundle for coupling light from a light source to the paper. The pen was passed over a record member having alternating 0.005 inches wide black bars and 0.020 inches wide white bars or spaces, at a relatively constant velocity with the pen tip being held adjacent the record member and normal thereto. Curve B of FIG. 2 represents an amplified signal corresponding to the output signal illustrated in Curve A. If an arbitrary line 32 is taken as a reference, it can be seen that the positive portions of the signal which correspond to the white spaces, are 10 divisions wide, whereas the negative portions, which correspond to the black bars, are 6 divisions wide. The ratio of the positive to negative signal portion widths accordingly does not truely indicate the 4:1 width ratio of the code. Therefore, if a code were to be used in which the relative bar widths contained data, the device illustrated in FIG. 2 would not be sensitive enough for detection. Physically larger code characters would be used to accommodate the device's sensitivity, with a corresponding loss in the amount of data that could be contained on any one given record number.

FIG. 3 shows the unamplified and amplified responses (in Curves A and B, respectively) of a device constructed according to the teachings of the invention when passed over an identical record member having 0.005 inch black bars and 0.020 inch white spaces. The shape of Curve A shows that bar width information is more faithfully recorded. By inspection of Curve B, wherein an arbitrary line 34 is considered as a reference, it can be seen that the positive portions of the signal, which correspond to the white spaces, require approximately 11 divisions, whereas the negative portions of the signal, which correspond to the black bars, occupy approximately 4 divisions. The positive to negative signal portion widths therefore more accurately reflect the 4:1 width ratio of the code than do the signals from the fiberoptic device.

Although element 16 has been described as a light source and element 18 as a light detector, it is apparent that element 18 could comprise a light source such as an LED which transmitted light through the center of the spherical member 12, and element 16 could comprise a photoresistor, a photodiode, a photocell or the like which received light reflected from the record member and refracted by the outer portions of a spherical member 12. This arrangement has the advantage over that previously described of providing greater immunity to stray ambient light because the detector is focused to a small spot. The previous arrangement in which element 16 comprises a light source and element 18 comprises a light detector can also be made relatively insensitive to ambient light if the light source has a relatively narrow-band wavelength output, such as that obtained from an LED, and the upper surface of substantially spherical member 12 is provided with a narrow-band optical filter. One typical embodiment includes the provision of an optical filter within transparent adhesive 19.

Figures 4, 5, 6:
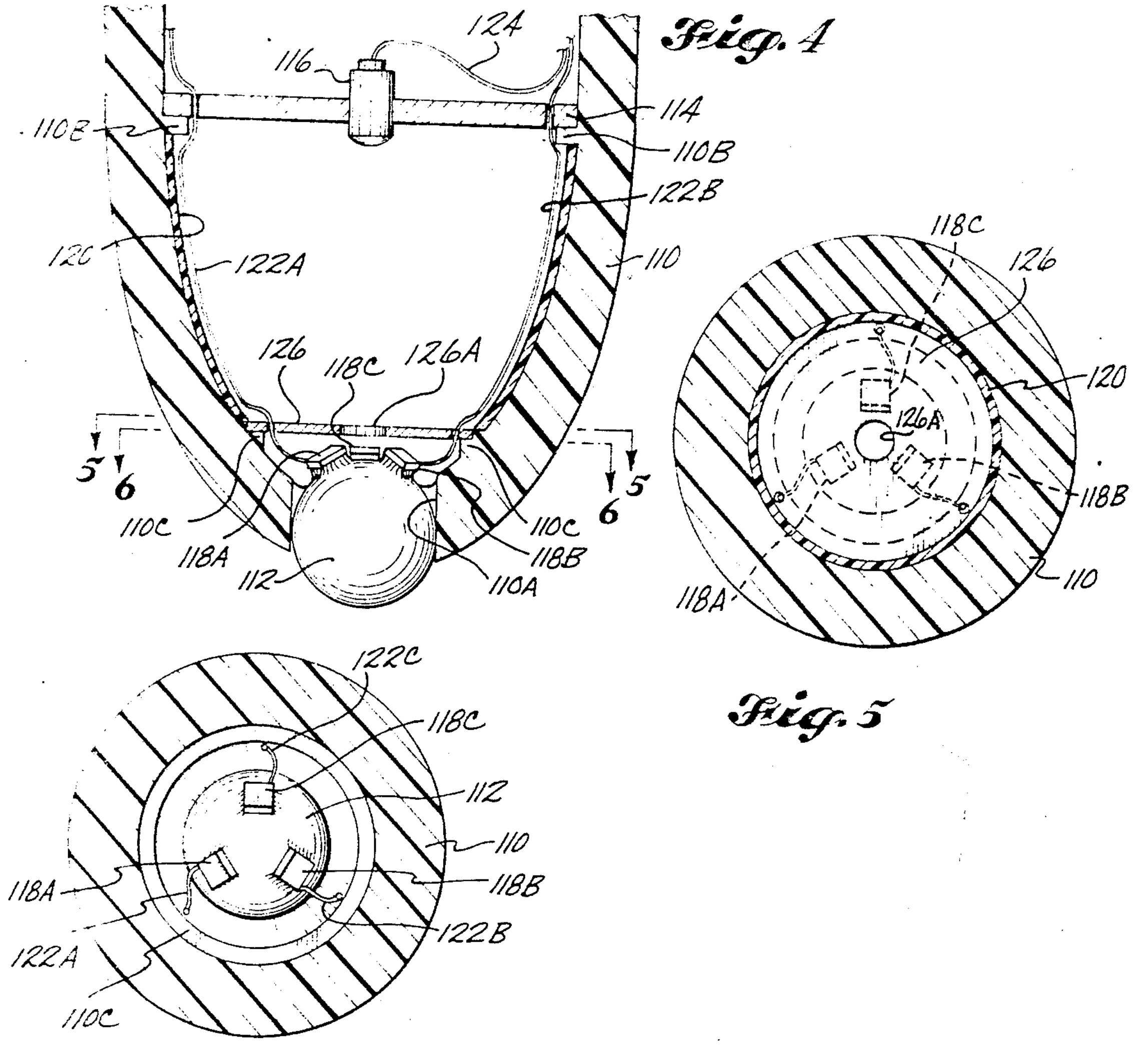
FIG. 4 is a side section view of a second embodiment of the invention.
FIGS. 5 and 6 are, respectively, plan section views taken along the lines indicated in FIG. 4 and illustrating the light detector arrangement therein.

With reference now to FIGS. 4–6, another embodiment of the invention is illustrated. A pen-shaped housing 110 defines a cylindrical aperture 110A at a lower end thereof which has situated therein a substanially spherical member 112, again of transparent material. An interior shoulder 110B of housing 110 supports a disc member 114 which in turn has situated in the center thereof a light source 116. A plurality of light detectors 118A, 118B and 118C are arranged around the top surface of substantially spherical member 112 and suitably affixed thereto by a transparent adhesive. if three light detectors 118 are used as illustrated, it is preferable that they be spaced at 120° angles. Output leads 112A, 122B and 122C are taken from light detectors 118A, 118B, and 118C and cabled together with leads 124 from light source 116 for connection to the remaining electrical circuitry of the device not illustrated.

A second interior shoulder 110C is provided in the cavity of housing 110 and supports an opaque masking disc 126 which has a centrally located apertures 126A. Preferably, light source 116 and aperture 126A are aligned with a diameter of substantially spherical member 112. Mask 126 prevents substantially all light from source 116 from falling on detectors 118A, 118B and 118C. The light from source 116 is directed by aperture 126A onto a small, central spot on the substantially spherical member 112. Therefore, on the top surface, the superior imaging and converging properties of the spherical center are utilized to define an intense spot adjacent the lower surface of spherical member 112. Reflections from a record member are then refracted to the outer portions of the spherical member 112 and detected by the detectors 118A, 118B and 118C.

Figures 7, 8:
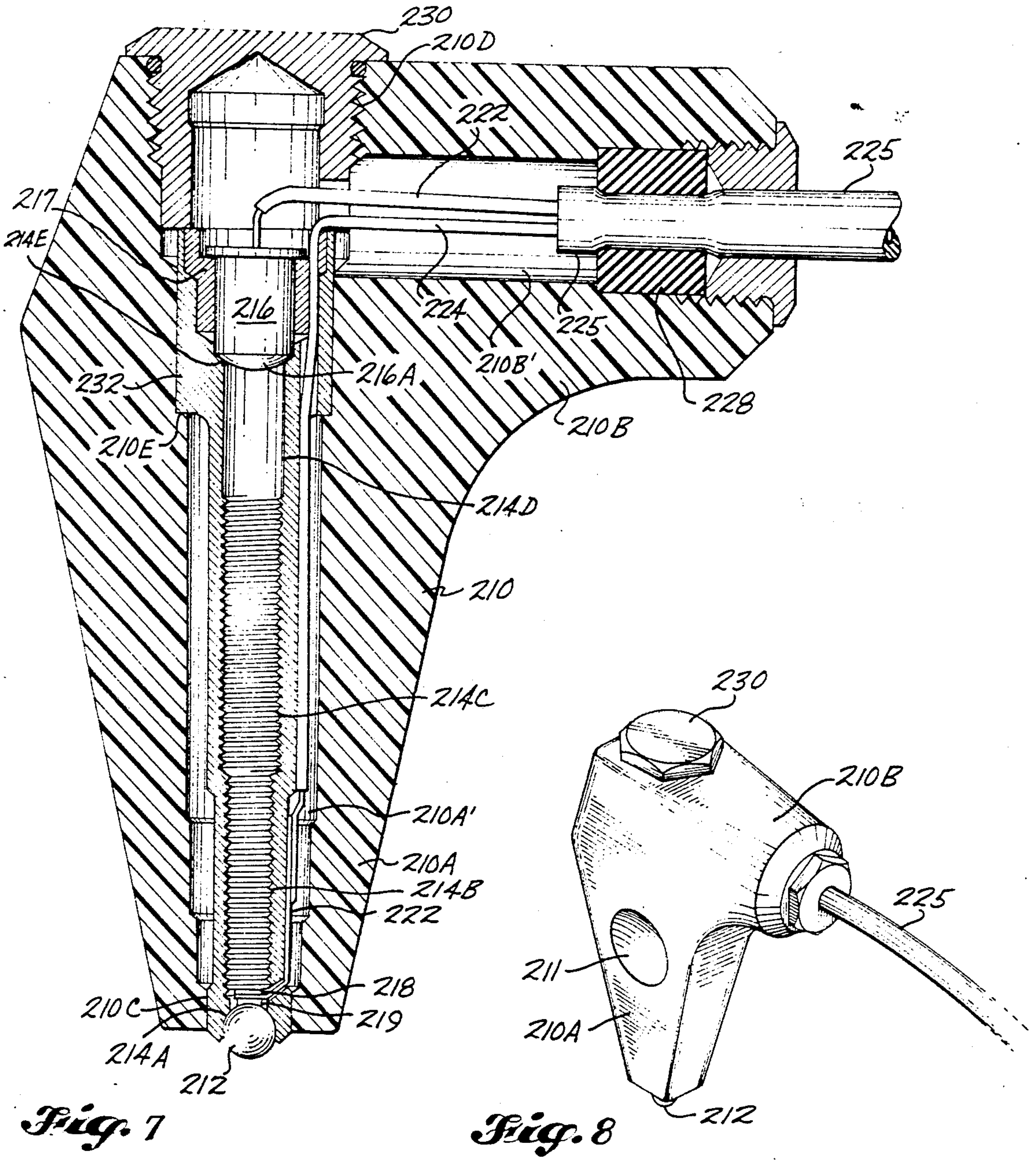
FIG. 7 is a side section view of a third embodiment of the invention.
FIG. 8 is a pictorial view illustrating the housing of the third embodiment.

With reference now to FIGS. 7 and 8, a third embodiment of the invention is illustrated. A housing 210 comprising a lower, tapered portions 210A and an integral, right-angle portion 210B. A pair of finger grip recesses are provided on either side thereof, with only recess 211A being shown in FIG. 8. The tapered housing 210 defines a cylindrical interior chamber 210A' communicating with a cylindrical passage 210C at a first end thereof and a cylindrical passage 210B at a second end thereof.

A support member 214 is introduced through passage 210D and includes a first surface 214' for engaging an interior shoulder 210E of the housing 210, and a second surface 214'' for engaging the cylindrical passage 210C. Support member 214 includes a socket 214A at one end for receiving a spherical member 212 and a plurality of successively larger diameter, interior threaded portions 214B, 214C, and 214D which define an interior light conducting chamber. A shoulder 214E is provided at the other end of support member 214 for holding a light-emitting diode 216 and its integral lens 216A. LED 216 and lens 216A are positioned on shoulder 214E during assembly to compensate for variations in the optical center of the light beam emanating therefrom, then maintained in phase by a potting material or adhesive 217.

Support member 214 may be composed of aluminum for structural rigidity and weight. By black anodizing the different-diameter, threaded internal portions 214B, 214C, and 214D, unwanted reflections are minimized. Support member 214 including a hemispherical surface 214A additionally functions as a mask for the outer portions of substantially spherical member 212.

A light detector 218 is secured to the upper surface of substantially spherical member 212 by a transparent adhesive 219. Electrical leads 222 associated with the light detector 218 and electrical leads 224 associated with the light-emitting diode 216 are passed through interior chamber 210A' and into a connecting, right-angle chamber 210B' provided in portion 210B. These leads are then formed into a cable 225 which is supported by a bushing 228, and thus made available for connection to the remaining electrical circuitry of the sensor, not illustrated. The cylindrical passage 210D is sealed by a closure 230.

This third embodiment shows the applicability of the base design of the invention to a finger-grip housing which is easier to manipulate in some applications than the pen-type housings shown in FIGS. 1 and 4. It should be clearly understood that the different light source and light detector arrangements previously described with regard to FIGS. 1 and 4 are applicable as well to the embodiment illustrated in FIGS. 7 and 8.

I claim:

1. An electro-optical reader for bar codes or the like which are contained on the surface of a record member, comprising:

a. a substantially spherical member composed of a transparent material, b. a housing, said housing having an interior and an exterior, and including means defining a passage connecting said interior to said exterior, c. first means supporting said substantially spherical member in said passage, d. a light source element and a light detector element, e. second means supporting one of said elements at a first position adjacent an upper surface of said substantially spherical member in said housing interior, and third means supporting the other of said elements at a second position in said housing interior at some further distance from said upper surface.

2. A reader as recited in claim 1, wherein said light detector element is disposed in said first position and said light source element is disposed in said second position.

3. A reader as recited in claim 2, wherein said housing further includes masking means situated within said interior adjacent said upper surface for masking all but the central portion of said upper surface from light emanating from said light source element.

4. A reader as recited in claim 3, wherein said light detector and light source elements are substantially aligned with a diameter of said substantially spherical member.

5. A reader as recited in claim 3, wherein said light detecting element comprises a plurality of phototransistors, and said second supporting means comprises a transparent adhesive securing said plurality of phototransistors to the portions of said upper surface which surround said central portion.

6. A reader as recited in claim 5, wherein said light source element comprises a light emitting diode.

7. A reader as recited in claim 2, wherein said light source and light detector elements are substantially aligned with a diameter of said substantially spherical member.

8. A reader as recited in claim 2, wherein said substantially spherical member comprises a synthetic sapphire ball.

9. A reader as recited in claim 2, wherein said light detector element comprises a phototransistor and said light source element comprises a light emitting diode.

10. A reader as recited in claim 9, wherein said second supporting means comprises a transparent adhesive securing said phototransistor to said upper surface of said substantially spherical member, and said third supporting means includes a shoulder defined by said housing in said interior, and a disc-like means supported by said shoulder and supporting in turn said light emitting diode.

11. A reader as recited in claim 1, wherein said light detector element is disposed at said second position and said light source element is disposed at said first position.

12. A reader as recited in claim 1, wherein said housing exterior is in the shape of a pen.

13. A reader as recited in claim 1, wherein said housing exterior has a finger-grip shape including a tapered portion having exterior finger-grip recesses.

14. A reader as recited in claim 1, wherein said housing further includes a light-absorbing means within said housing interior between said first and second positions.

15. A reader as recited in claim 1, wherein said housing is divided into a grippable member having a cavity, and a suppport member situated within said cavity which includes means defining said housing interior and said passage, and further includes said first, second, and third supporting means.

16. A reader as recited in claim 2, wherein said light source has a relatively narrow-band wavelength output, and further comprising narrow-band optical filter means disposed between said upper surface of said substantially spherical member and said light detector element.

17. A reader as recited in claim 9, wherein said second supporting means comprises a transparent adhesive securing said phototransistor to said upper surface of said substantially spherical member.

18. A reader as recited in claim 9, wherein said third supporting means includes a shoulder defined by said housing in said interior, and potting means holding said light-emitting diode against said shoulder.

* * * * *